United States Patent [19]

Hull

[11] Patent Number: 5,632,600

[45] Date of Patent: May 27, 1997

[54] REINFORCED ROTOR DISK ASSEMBLY

[75] Inventor: Peter R. Hull, Ipswich, Mass.

[73] Assignee: General Electric Company, Cincinnati, Ohio

[21] Appl. No.: 577,073

[22] Filed: Dec. 22, 1995

[51] Int. Cl.$^6$ ........................................ F01D 1/24
[52] U.S. Cl. ........................................ 416/198 A
[58] Field of Search ..................... 416/198 A, 201 R, 416/244 A, 218; 415/173.7

[56] References Cited

U.S. PATENT DOCUMENTS

| | | | |
|---|---|---|---|
| 3,554,667 | 1/1971 | Wagle | 416/218 |
| 3,610,777 | 10/1971 | Wagle | 416/198 A |
| 3,625,634 | 12/1971 | Stedfeld | 416/198 A |
| 3,888,602 | 6/1975 | Nichols et al. | 416/198 A |

FOREIGN PATENT DOCUMENTS 3101250  8/1982  Germany .................... 416/198 A

*Primary Examiner*—John T. Kwon
*Attorney, Agent, or Firm*—Andrew C. Hess; Wayne O. Traynham

[57] ABSTRACT

A reinforced rotor disk assembly includes a rotor disk having a rim, hub, and web therebetween. The web includes at least one annular extension spaced radially inwardly of the rim. A plurality of rotor blades extend outwardly from the rim. And, a reinforcing ring is disposed radially around the extension for restraining radial outward growth thereof to react centrifugal load in the disk. The reinforcing ring preferably includes a plurality of circumferentially extending structural fibers in a corresponding matrix for carrying hoop loads therein.

8 Claims, 2 Drawing Sheets

REINFORCED ROTOR DISK ASSEMBLY

BACKGROUND OF THE INVENTION

The present invention relates generally to gas turbine engines, and, more specifically, to rotors therein.

A typical gas turbine engine includes a compressor that compresses air which is mixed with fuel and ignited in a combustor for generating combustion gases which flow downstream through one or more turbine stages which extract energy therefrom. The turbine stages drive the compressor, and in one example, also drive an upstream fan for developing propulsion forces for powering an aircraft in flight. In this arrangement, a high pressure turbine powers the compressor and a low pressure turbine powers the fan.

Each of the fan, compressor, and turbine sections includes one or more rows or stages of rotor disks each having a plurality of circumferentially spaced apart rotor blades extending outwardly therefrom. The rotor blades typically cooperate with stationary stator vanes disposed axially adjacent thereto for suitably channeling air or combustion gases in a conventional manner.

The rotor disks which support the rotor blades have various configurations including for example a radially outer rim to which the rotor blades are suitably attached, a radially inner hub, and an annular web extending integrally therebetween. The outer diameter of the rim is selected for positioning the corresponding rotor blades at a suitable radial elevation for maximizing performance of the engine. Since the rotor disks and blades thereon typically operate at relatively high rotational speeds, the centrifugal loads generated therefrom create substantial centrifugal stress in the rotor disks which must be maintained suitably below the yield strength of the disk material for ensuring an effective useful life of the disk during operation. The centrifugal loads generated in the material being rotated are proportional to the radius from the disk centerline. The substantial centrifugal loads developed by the rotor blades must be carried by the rotor disk positioned radially inwardly thereof. The rotor disk itself also develops centrifugal loads, with the disk being the sole structural element for carrying all of the developed centrifugal loads.

Accordingly, in order to maintain centrifugal stress in the rotor disk suitably below the yield strength of the material, the disk rim, web, and hub are suitably configured for providing sufficient material for distributing the centrifugal loads to reduce the maximum developed centrifugal stress. The centrifugal loads are primarily carried in the circumferential hoop direction of the disk and generate corresponding tensile hoop stresses therein during operation. The disk web is typically axially thinner or narrower than the rim and hub for minimizing weight while suitably spreading the centrifugal loads. The hub typically includes a central bore, with the inner diameter of the hub being selected for ensuring effective distribution of the centrifugal loads for reducing centrifugal stress.

However, since the disk rotates during operation, it produces centrifugal force which must also be accommodated within the disk itself in addition to the substantial centrifugal force generated by the rotor blades attached thereto. In an aircraft gas turbine engine, for example, reducing overall engine weight is a significant design concern, with it being desirable to have rotor disks being as light as possible which is achieved by making the disk axially thin and with a relatively large hub inner diameter. Weight reduction is limited since the rotor disk must be suitably thick and the hub inner diameter must be suitably small so that the rotor disk contains sufficient material for carrying the resulting centrifugal loads.

Furthermore, as indicated above, rotors are typically found in adjoining stages and must therefore be structurally interconnected by integral extensions which define rotor shafts. The extensions may be directly bolted together, or may abut together in a simple rabbet joint or a more complex toothed joint conventionally known as a curvic coupling, with the joint being conventionally held together by a conventional axial compression load. Since the disk extensions rotate with the disks themselves, they too also add to the centrifugal loads generated during operation which must also be accommodated by the corresponding rotor disks. The shaft extensions are preferably disposed at about the same radius as the adjoining disk rims and provide an annular land with which a suitable seal may be formed with a corresponding stage of stator vanes disposed axially between adjacent stages of rotor blades.

However, it is possible for a particular rotor design, including a relatively large rim diameter and relatively high rotational speed, that the shaft extensions themselves would exceed their own yield strength making the design impractical. In such a situation, it is conventionally known to lower the radius of the shaft extensions below the radius of the corresponding disk rims, and then provide a suitable radially inner shroud for the interstage stator vanes to occupy the resulting cavity created thereby. In this way, the shaft extensions are lowered in radius to a position wherein the circumferential stress developed therein will be suitably below the yield strength of the material. However, this shrouded stator design is relatively complex and expensive to implement.

SUMMARY OF THE INVENTION

A reinforced rotor disk assembly includes a rotor disk having a rim, hub, and web therebetween. The web includes at least one annular extension spaced radially inwardly of the rim. A plurality of rotor blades extend outwardly from the rim. And, a reinforcing ring is disposed radially around the extension for restraining radial outward growth thereof to react centrifugal load in the disk. The reinforcing ring preferably includes a plurality of circumferentially extending structural fibers in a corresponding matrix for carrying hoop loads therein.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
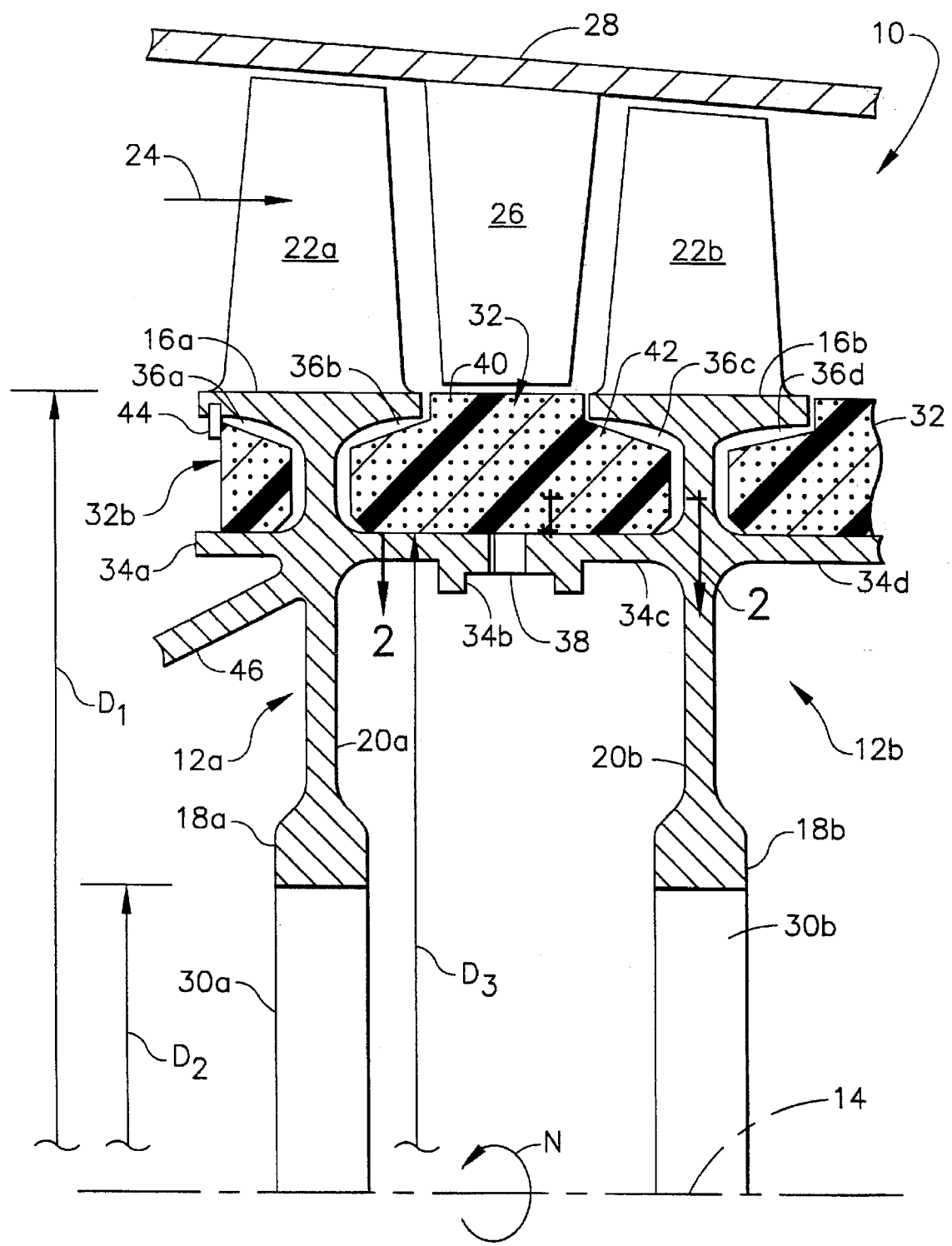
FIG. 1 is an elevational, partly sectional view of a portion of a gas turbine engine rotor disk assembly including a pair of adjoining rotor stages, with a stator vane stage being disposed axially therebetween, having rotor disks reinforced in accordance with one embodiment of the present invention.

Illustrated schematically in FIG. 1 is a portion of a gas turbine engine rotor assembly 10 in accordance with one embodiment of the present invention. The assembly 10 includes a first rotor disk 12a which adjoins a second rotor disk 12b coaxially about an axial centerline axis 14. Each disk 12a,b includes a corresponding radially outer rim 16a,b, radially inner hub 18a,b and an integral web 20a,b extending radially therebetween.

Each rotor disk includes a plurality of circumferentially spaced apart rotor blades 22a,b which extend radially outwardly from the respective rims 16a,b thereof. The blades 22a,b may be integrally joined with the respective rims 16a,b in a conventional manner referred to as a blisk, or each rotor blade may be removably joined to the rims in a conventional manner using corresponding blade dovetails which mount in complementary slots in the respective rims.

In the exemplary embodiment illustrated in FIG. 1, two rotor stages are illustrated with the corresponding first and second rotor blades 22a,b being suitably configured for cooperating with a motive or working fluid 24, such as air for example. In the exemplary embodiment illustrated in FIG. 1, the rotor assembly 10 is in the form of a fan or compressor of a gas turbine engine, with the rotor blades 22a,b being used for suitably compressing the motive fluid air 24 in succeeding stages. Disposed axially between the two stages of rotor blades 22a,b is a row of circumferentially spaced apart compressor stator vanes 26 suitably suspended from an annular outer casing 28.

Although the rotor assembly 10 is configured in the exemplary form of a fan or compressor, it is also representative of a typical multi-stage turbine wherein the motive fluid 24 would be combustion gases from which energy is extracted by the rotor blades. In the turbine configuration, the rotor blades would increase in size in the axial downstream direction as is conventionally known.

In the various configurations described above including fan, compressor, or turbine rotor assembly, the corresponding disks 12a,b and blades 22a,b rotate about the centerline axis 14 up to a specific maximum design rotational speed N, and therefore generate significant centrifugal loads in the rotating components which must be suitably accommodated for maintaining the resulting centrifugal stress generated thereby suitably below the corresponding yield strengths of the materials being used. Each of the disks 12a,b has a corresponding outer diameter $D_1$, which in the exemplary embodiment illustrated in FIG. 1 forms a portion of the inner flowpath for the fluid 24. Each of the disk hubs 18a,b has a corresponding inner diameter $D_2$ defined by a central bore 30a,b therein.

Each rim, web, and hub of the respective disks 12a,b has a generally conventional configuration with the webs being axially thinner or narrower than the enlarged rims and hubs for minimizing weight and maximizing strength for accommodating the various centrifugal loads generated during operation. However, in accordance with the present invention, the disk inner diameters $D_2$ are preferably larger than they would otherwise be, with the radial height of the disk as represented by the difference between the outer diameter $D_1$ and the inner diameter $D_2$ being smaller than a corresponding design having identically sized rotor blades 22a,b. Each disk therefore may be reduced in both size and weight which are significant design objectives in improving the overall gas turbine engine design. However, without the removed material in the otherwise larger disks required for carrying the resulting centrifugal loads at the maximum rotational speed N, the resulting centrifugal stress within the disks 12a,b would be unacceptably high in all or portions of the respective disks.

In accordance with the present invention, a structural reinforcing ring 32 is provided to reinforce each disk 12a,b for maintaining centrifugal stress therein suitably below the yield strength of the material thereof. More specifically, each disk web 20a,b includes at least one axially extending, coaxial, annular extension designated generally by the prefix 34 which is spaced radially inwardly of the corresponding rims 16a,b to define respective cavities therebetween as identified generally by the prefix 36.

In the exemplary embodiment illustrated in FIG. 1, the first disk 12a includes a forward web extension 34a which defines with the forward the portion of the rim 16a a forward cavity 36a. The first disk 12a also includes an aft web extension 34b which defines with the aft portion of the rim 16a a corresponding aft cavity 36b. Similarly, the second disk 12b a web forward extension 34c defining a forward cavity 36c, and a web aft extension 34d defining a corresponding aft cavity 36d.

Figure 2:
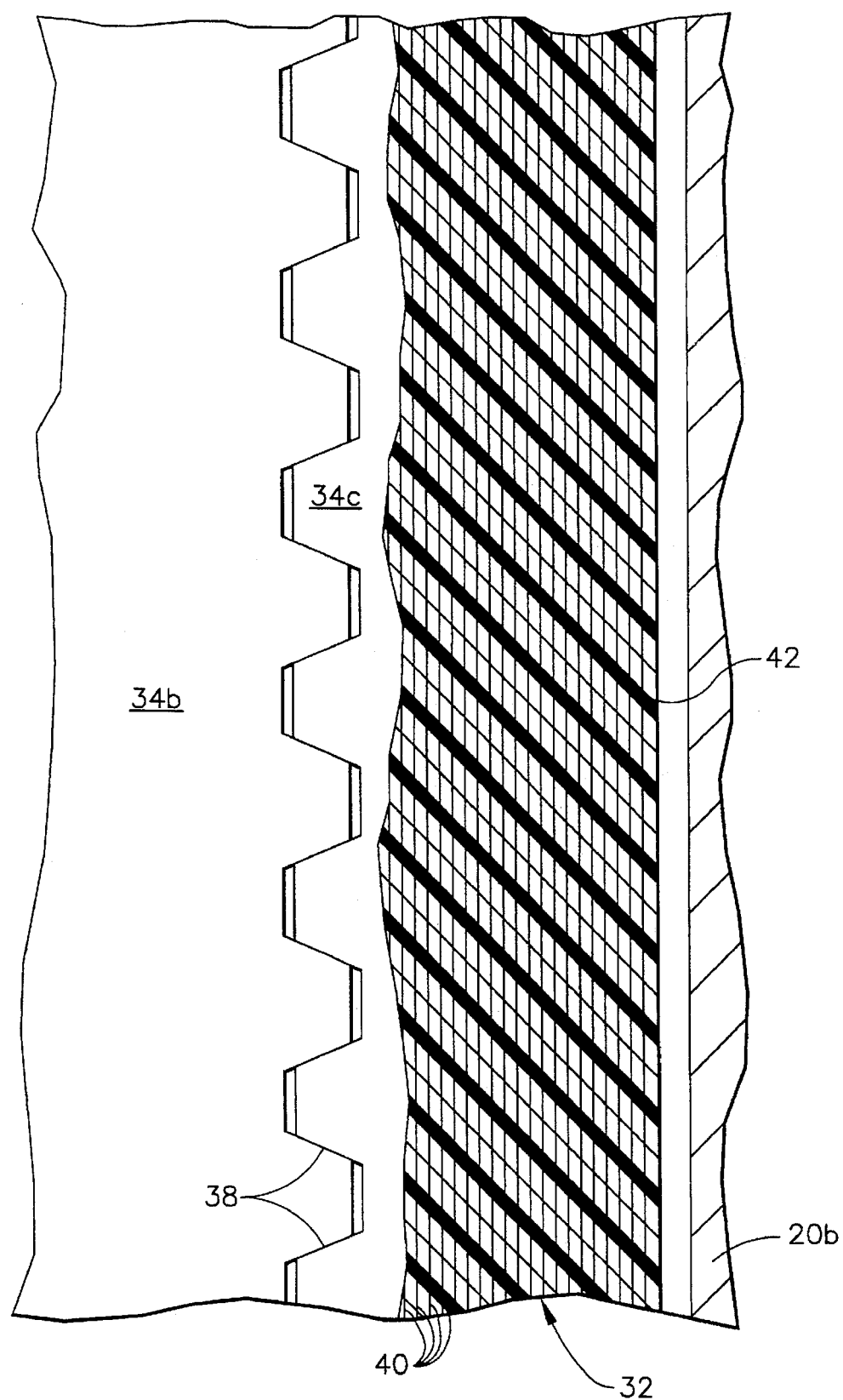
FIG. 2 is a top, partly sectional view through a reinforcing ring surrounding adjoining extensions of the two rotor disks illustrated in FIG. 1 and taken generally along line 2—2.

In the exemplary embodiment illustrated in FIG. 1, the aft extension 34b of the first disk 12a is disposed coaxially with the forward extension 34c of the second disk 12b and is conventionally fixedly joined thereto to define a common rotor shaft for carrying torque loads to drive the blades 22a,b during operation. The joint between the two shaft extensions 34b,c may take any suitable form including a conventional curvic coupling 38 which is illustrated in more particularity in FIG. 2. The coupling includes corresponding truncated teeth formed integrally with respective ones of the extensions 34b,c which engage together for preventing differential circumferential movement between the two rotor disks 12a,b. In alternate embodiments (not shown) a conventional rabbet joint may instead be provided, or the joint may be a conventional bolted design.

The adjacent aft cavity 36b of the first disk 12a and the forward cavity 36c of the second disk 12b collectively define a common cavity in which the reinforcing ring 32 is disposed. The ring 32 in this first embodiment is sized and configured to occupy both of the aft and forward cavities 36b,c radially surrounding both the aft and forward extensions 34b,c for reinforcing in part both of the first and second rotor disks 12a,b, respectively. In the event a third rotor stage is disposed downstream of the second rotor disk 12b, a corresponding reinforcing ring 32 would be disposed over the adjoining web extensions.

Since the first disk 12a is a first stage disk in this exemplary embodiment, the forward extension 34a merely defines a truncated annular land around which a truncated or axially shorter second embodiment of the reinforcing ring 32b may be disposed. In the exemplary embodiment of the reinforcing rings 32 and 32b illustrated in FIG. 1, the corresponding web extensions 34a–d are preferably cylindrical with corresponding outer diameters $D_3$, with the corresponding rings 32, 32b including cylindrical center bores disposed in radially abutting contact with the respective web extensions 34 for reinforcing the corresponding disks 12a,b.

More specifically, the reinforcing rings are disposed in the respective cavities radially around the web extensions for restraining radial outward growth or expansion of the web extensions to react centrifugal load in the disks 12a,b upon rotation thereof. Each embodiment of the reinforcing rings 32 and 32b is preferably a lightweight, high strength, composite material including a plurality of circumferentially extending reinforcing structural fibers 40 disposed in a suitable integral matrix 42 as shown in different sectional views in FIGS. 1 and 2. The fibers 40 have a high strengthto-weight ratio for carrying hoop loads therein and constraining radial growth of the respective rotor disks 12a,b.

During operation, the two rotor disks 12a,b are suitably rotated up to the maximum design rotational speed N which causes centrifugal force to be generated therein. Centrifugal force causes the rotor disk 12a,b to expand radially outwardly which expansion is restrained and limited by the reinforcing rings 32 and 32b which surround the corresponding web extensions 34. The structural fibers 40 have a substantially higher stiffness than that of the parent metal material of the rotor disks 12a,b themselves, and therefore restrain radial expansion of the rotor disks. As the centrifugal load is developed during rotation of the disks, a corresponding portion thereof is transferred through the web extensions 34 into the respective reinforcing rings 32, 32b which develop hoop loads in the circumferentially extending structural fibers 40 therein. The fibers 40 react the disk centrifugal load and limit centrifugal stress in the disks 12a,b themselves.

The reinforcing rings 32, 32b are lower in density than the parent metal material of the disks 12a,b and therefore contribute less to the total centrifugal load developed during rotary operation. The reinforcing rings are also structurally stiffer than the rotor disks and correspondingly restrain centrifugally induced expansion thereof during operation. This arrangement therefore allows a larger inner diameter $D_2$ of the corresponding hubs 18a,b than would otherwise be possible for a given disk outer diameter $D_1$. The disks 12a,b may therefore be made smaller in size for the given outer diameter $D_1$, with correspondingly reduced weight which reduces the centrifugal load which must be carried by the disks themselves and the reinforcing rings 32, 32b. In this way, a relatively large radial diameter of the flowpath defined by the rotor blades 22 may be maintained while decreasing the size and weight of the required rotor disks 12a,b which support the blades 22.

Since the relatively high density web extensions 34 of the parent disk material are spaced radially inwardly from the respective disk rims 16a,b to create the cavities 36 in which the lower density reinforcing rings 32, 32b are positioned, centrifugal load developed by the web extensions 34 themselves are correspondingly reduced, which further improves the design of the assembly. Since the reinforcing ring 32 between the first and second rotor blades 22a,b occupies the corresponding cavities 36b,c, the ring 32 itself provides a suitable component with which a seal with the stator vanes 26 may be obtained without the use of the conventional and costly shrouded stator vane design.

Yet an additional advantage of using the reinforcing rings 32 is that the outer diameter $D_3$ of the various web extensions 34 may be sized for generating centrifugal stress in the extensions 34 during operation of the first and second rotors 12a, 12b at the maximum rotary speed N which would exceed the yield strength of the web extension materials but for the reinforcing rings 32 which carry a portion of the centrifugal loads and thereby limit the maximum centrifugal stress developed in the web extensions 34. In this way, the rings 32 limit the stress in the web extensions 34 suitably below the yield strength of the parent material.

The interstage reinforcing rings 32 illustrated in FIG. 1 may be readily assembled therein by being simply axially positioned over either one of the web extensions 34b,c prior to axially joining together the two disks 12a,b at the curvic coupling 38. Once the disks 12a,b are joined together, the interstage reinforcing ring 32 is axially retained or trapped therebetween. The end-stage embodiment of the reinforcing ring 32b illustrated in FIG. 1 may be suitably axially retained on the forward extension 34a. In the exemplary embodiment illustrated, a suitable split ring retainer 44 is disposed in a complementary slot in the inner surface of the forward portion of the rim 16a for axially abutting the forward end of the reinforcing ring 32b. In this arrangement, centrifugal force retains the ring retainer 44 in its complementary slot in the rim 16a. The first rotor disk 12a may be conventionally supported on a bearing (not shown) by a conical forward shaft 46 which joins the first web 20a suitably below the forward web extension 34a.

In the preferred embodiment of the invention, the reinforcing ring 32 has a higher stiffness-to-density ratio than the parent material of the first and second rotor disks 12a,b. And, the reinforcing ring 32 preferably has a lower coefficient of thermal expansion than that of the first and second rotor disks 12a,b to ensure that differential thermal expansion between the rotor disks 12a,b and the reinforcing rings 32 is restrained by the rings 32 themselves.

Various conventional composite materials are available for use in different embodiments of the reinforcing rings 32 for use in the hostile environment of a gas turbine engine. For a relatively low temperature environment of a gas turbine engine compressor rotor assembly less than about 600° F., a suitable organic matrix composite (OMC) may be used, with the fibers 40 being boron in an epoxy matrix 42, or graphite in either an epoxy matrix or a polyimide matrix 42. For a high temperature compressor rotor assembly greater than about 600° F., the reinforcing rings may be a suitable metal matrix composite (MMC), with the fibers 40 being silicon carbide in a titanium matrix 42 or boron in an aluminum matrix for example. And, for a very high temperature application such as a turbine rotor assembly, the reinforcing rings may be the metal matrix composite, or a ceramic matrix composite (CMC), with the fibers 40 being silicon carbide in a silicon carbide matrix 42, or carbon (graphite) fibers in a silicon nitride matrix 42, or alumina ($AL_2O_3$) fibers in a carbon matrix for example.

Yet an additional advantage of the present invention is that centrifugally generated loads and stresses in the region of the coupling 38 itself are also reduced which reduce or eliminate conventional low cycle fatigue problems associated therewith. Typical joints, be they bolted, rabbet, or curved coupling, typically create stress concentration which can be ameliorated by reducing the centrifugal load in the region of the joints. The interstage reinforcing ring 32 effectively reduces the centrifugally generated loads and corresponding stresses which are carried by the interstage web extensions or shafts themselves.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

I claim:

1. A gas turbine engine rotor assembly comprising:
   a rotor disk including a radially outer rim, a radially inner hub, and a web extending therebetween, said web including at least one coaxial annular extension spaced radially inwardly of said rim to define a cavity therebetween;

a plurality of circumferentially spaced apart rotor blades extending radially outwardly from said rim;

a reinforcing ring disposed in said cavity radially around said extension for restraining radial outward growth of said extension to react centrifugal load in said disk upon rotation thereof, and wherein said ring includes a plurality of circumferentially extending structural fibers in a matrix for carrying hoop loads therein; and means for axially retaining said ring on said extension including a split ring retainer disposed in a complementary slot in said rim and axially abutting said reinforcing ring.

2. An assembly according to claim 1 wherein said web extension is cylindrical, and said ring includes a cylindrical bore disposed in radially abutting contact with said extension so that said ring fibers develop said hoop loads to react said disk centrifugal load and limit centrifugal stress in said disk.

3. A gas turbine engine rotor assembly comprising:

a first rotor disk including a radially outer rim, a radially inner hub, and a web extending therebetween, said web including at least one coaxial annular extension spaced radially inwardly of said rim to define a cavity therebetween;

a plurality of circumferentially spaced apart rotor blades extending radially outwardly from said rim;

a reinforcing ring disposed in said cavity radially around said extension for restraining radial outward growth of said extension to react centrifugal load in said disk upon rotation thereof, and wherein said ring includes a plurality of circumferentially extending structural fibers in a matrix for carrying hoop loads therein: and means for axially retaining said ring on said extension including an adjacent second rotor disk fixedly joined to said first disk.

4. An assembly according to claim 3 wherein:

said second rotor disk includes a radially outer second rim, a radially inner second hub, and a second web therebetween, said second web including a forward extension spaced radially inwardly of said second rim to define a forward cavity therebetween;

said web extension of said first disk defines an aft extension disposed coaxially with said forward extension of said second disk, and is fixedly joined thereto to define a common rotor shaft, with said aft extension defining an aft cavity of said first disk being joined together with said forward cavity of said second disk; and said reinforcing ring is sized and configured to occupy both said aft and forward cavities and radially surround said aft and forward extensions for reinforcing both said first and second rotor disks.

5. An assembly according to claim 4 wherein said aft and forward extensions have a diameter sized for generating centrifugal stress therein, during operation of said first and second rotor disks at a corresponding rotary speed, exceeding a yield strength thereof but for said reinforcing ring.

6. An assembly according to claim 4 wherein said reinforcing ring has a higher stiffness-to-density ratio than said first and second rotor disks.

7. An assembly according to claim 4 wherein said reinforcing ring has a lower coefficient of thermal expansion than said first and second rotor disks.

8. An assembly according to claim 4 wherein said reinforcing ring is a composite including organic matrix composite, metal matrix composite, or ceramic matrix composite.

* * * * *